J. J. HUMMEL.
TYPE SETTING AND DISTRIBUTING MACHINE.
APPLICATION FILED MAY 21, 1917.

1,291,900.

Patented Jan. 21, 1919.
8 SHEETS—SHEET 4.

INVENTOR
John J. Hummel.

BY
L. L. Westfall
ATTORNEY

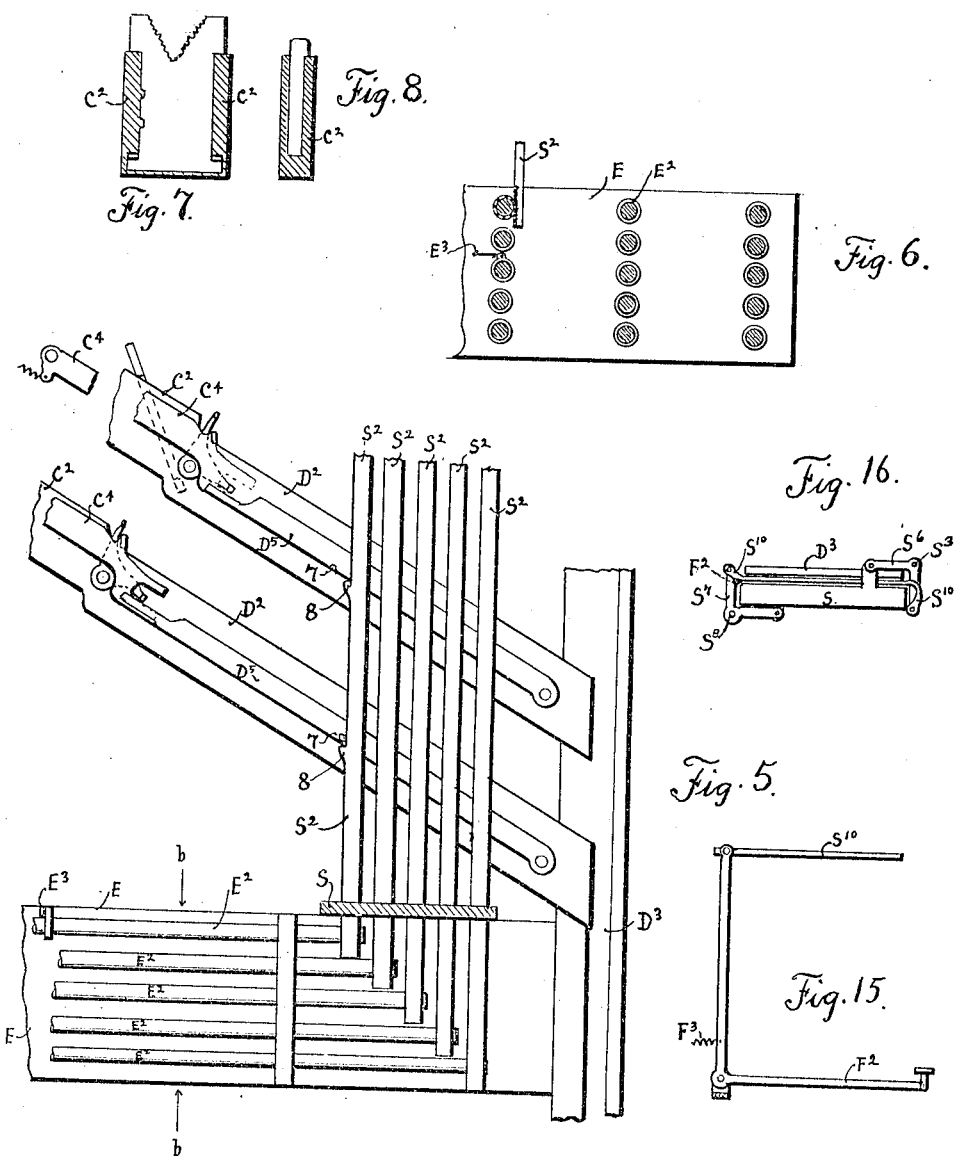

J. J. HUMMEL.
TYPE SETTING AND DISTRIBUTING MACHINE.
APPLICATION FILED MAY 21, 1917.
1,291,900.
Patented Jan. 21, 1919.
8 SHEETS—SHEET 6.
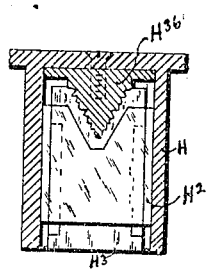
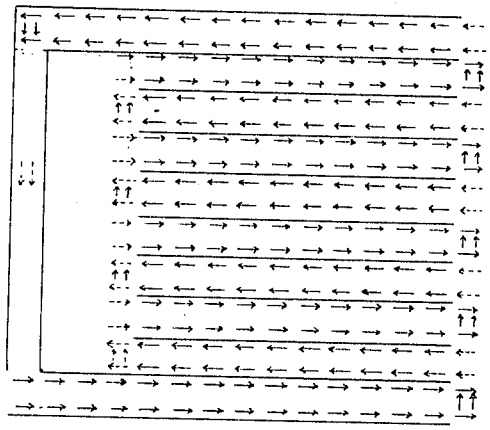
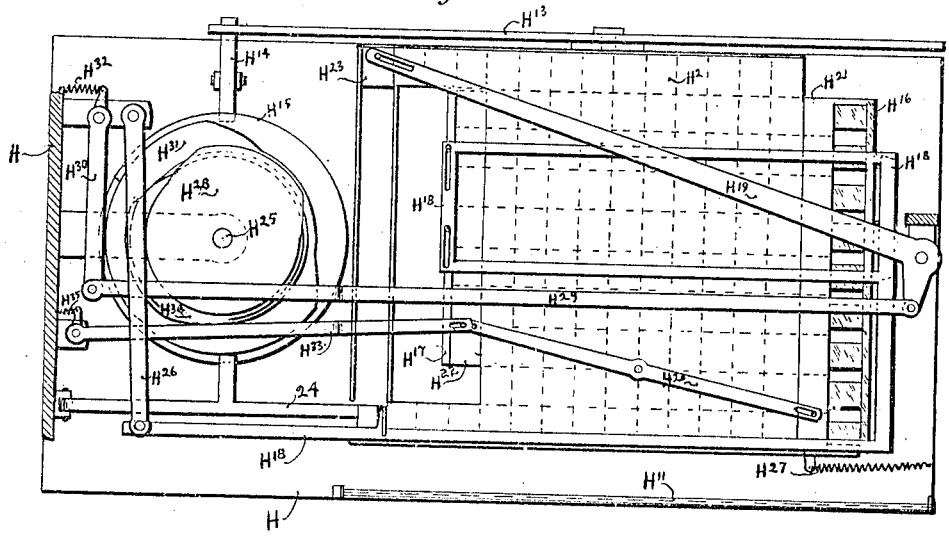
INVENTOR
John J. Hummel.
BY
L. L. Westfall
ATTORNEY J. J. HUMMEL.
TYPE SETTING AND DISTRIBUTING MACHINE.
APPLICATION FILED MAY 21, 1917.

1,291,900.

Patented Jan. 21, 1919.
8 SHEETS—SHEET 7.

INVENTOR
John J. Hummel.

BY
L. L. Westfelt
ATTORNEY

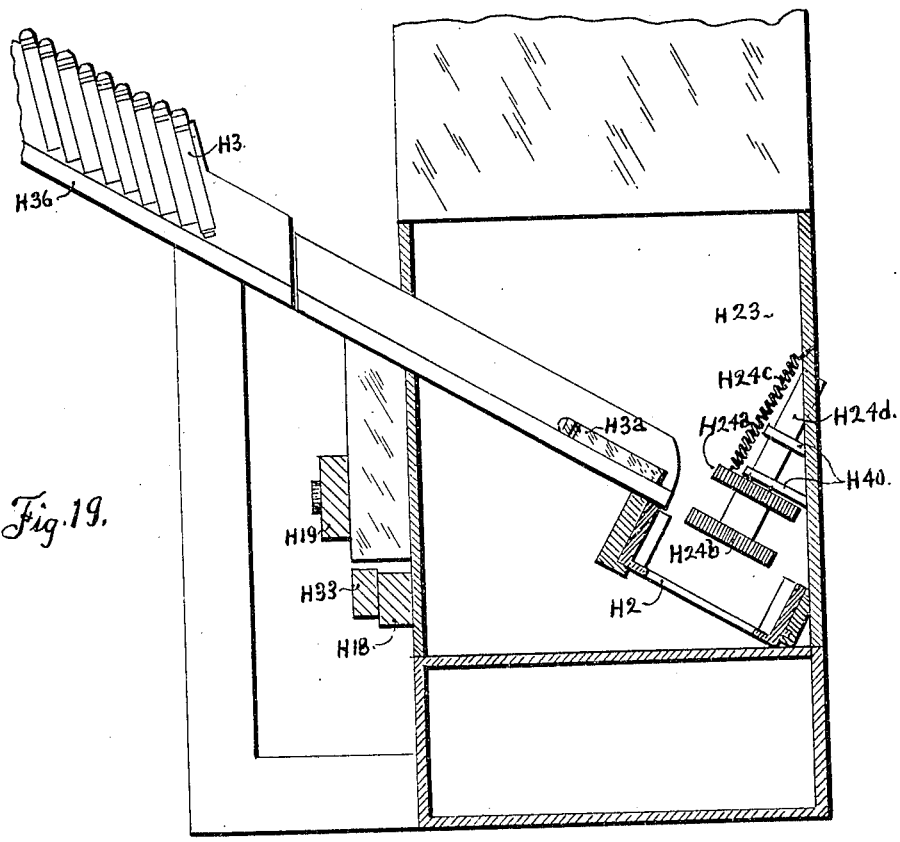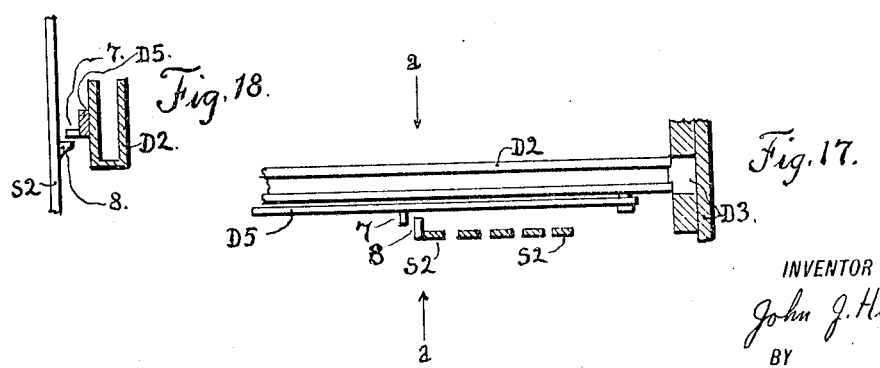

UNITED STATES PATENT OFFICE.

JOHN J. HUMMEL, OF SPOKANE, WASHINGTON.

TYPE SETTING AND DISTRIBUTING MACHINE.

1,291,900.  Specification of Letters Patent.  Patented Jan. 21, 1919.

Application filed May 21, 1917. Serial No. 169,957.

*To all whom it may concern:*

Be it known that I, JOHN J. HUMMEL, a citizen of the United States of America, residing at Spokane, in the county of Spokane and State of Washington, have invented certain new and useful Improvements in Type Setting and Distributing Machines, of which the following is a specification.

The invention relates to machines for composing lines of type or type matrices and to distribute the type or matrices back into the magazine.

Among the principal objects which the present invention has in view are: to provide a magazine divided into sections of a more simple construction; to provide a keyboard with a letter shift; to provide a distributer, power operated, that will by means of carriers carry the individual type or matrices by a step by step movement to each one of the sections of the magazine and to each one of the compartments of each section, and to provide a movement whereby the carriers will continually circulate through the distributer.

A further object of the invention is to provide a construction whereby matrices may lie in the compartment of the magazine in an inclined position, and come down by gravity broad side first, until they reach the delivery chute.

One embodiment of the present invention is disclosed in the structure illustrated in the accompanying drawings, in which like characters of reference denote corresponding parts in all the views, and in which—

Figure 1:
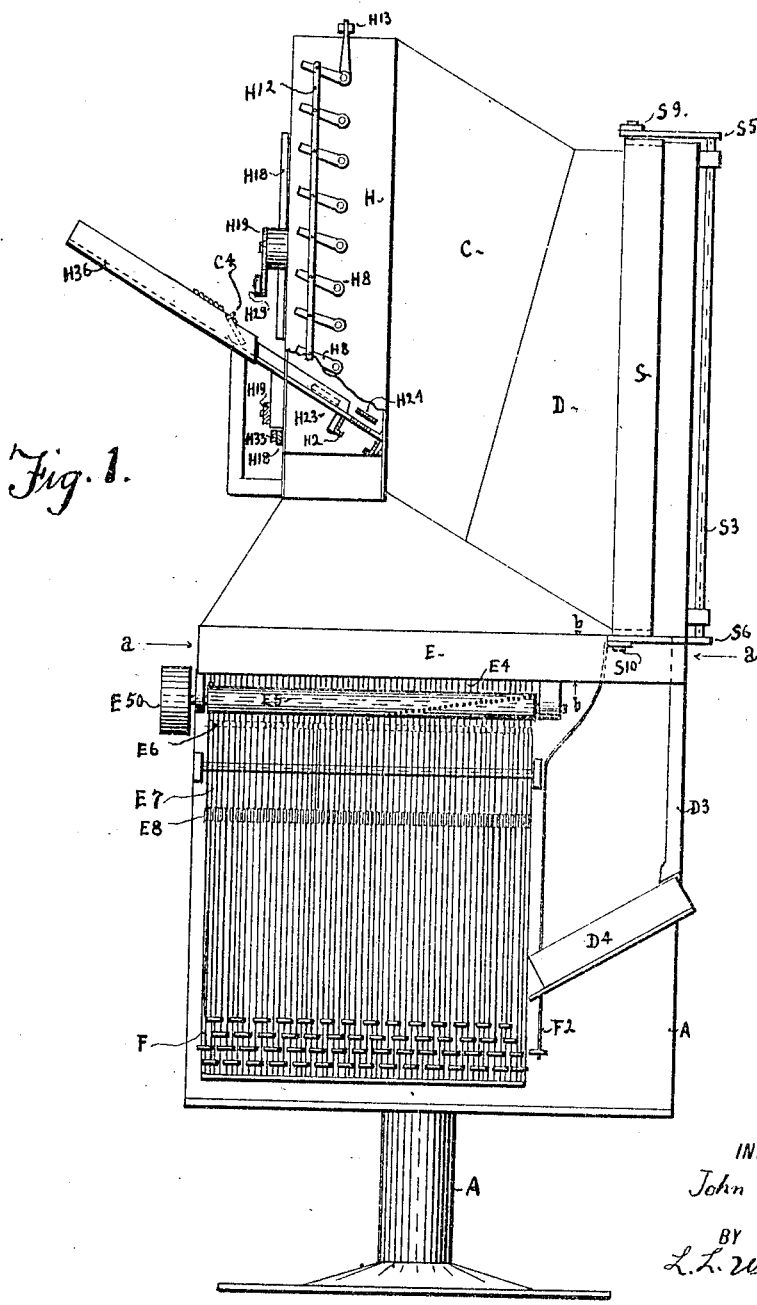
Figure 2:
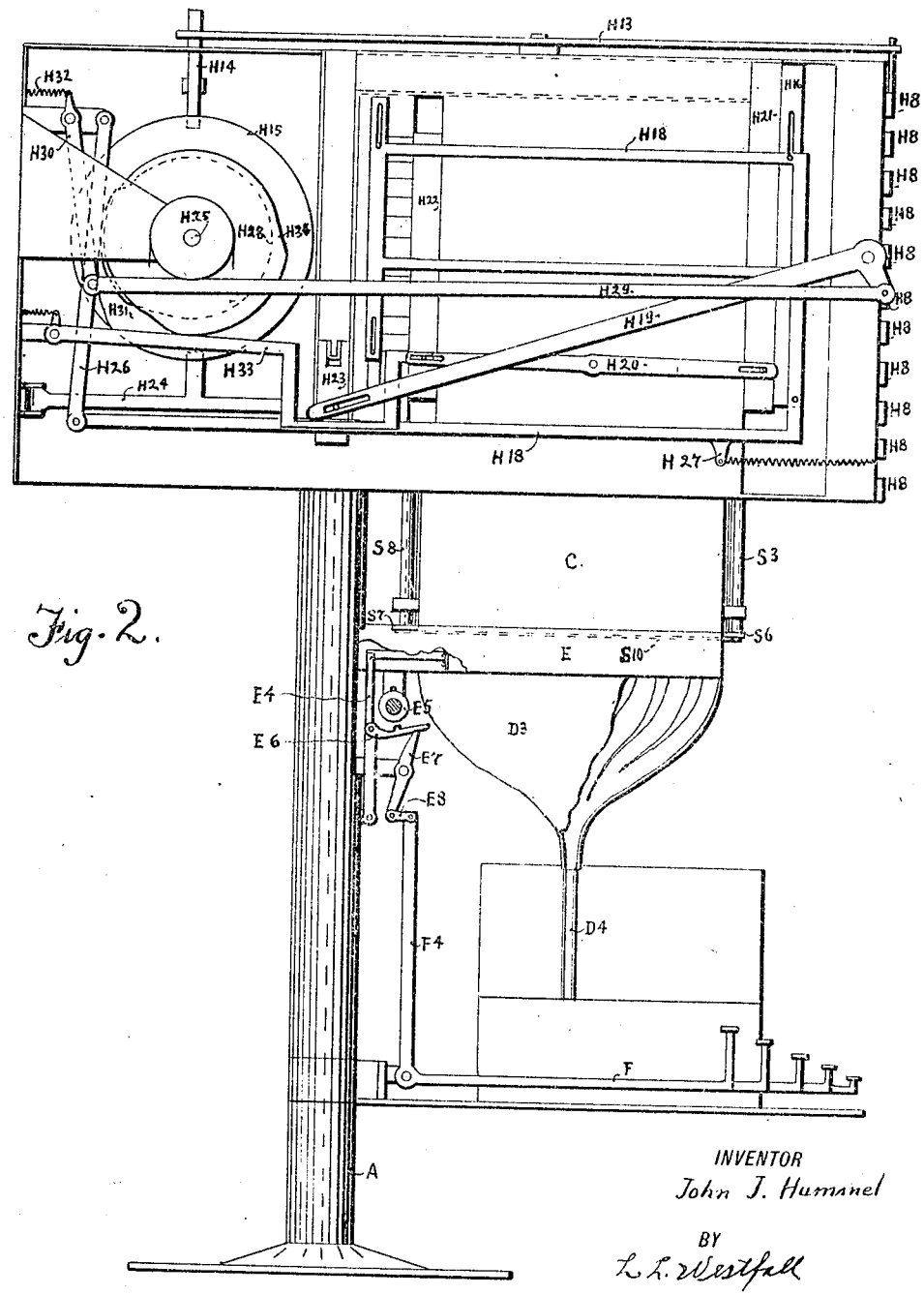
Figure 3:
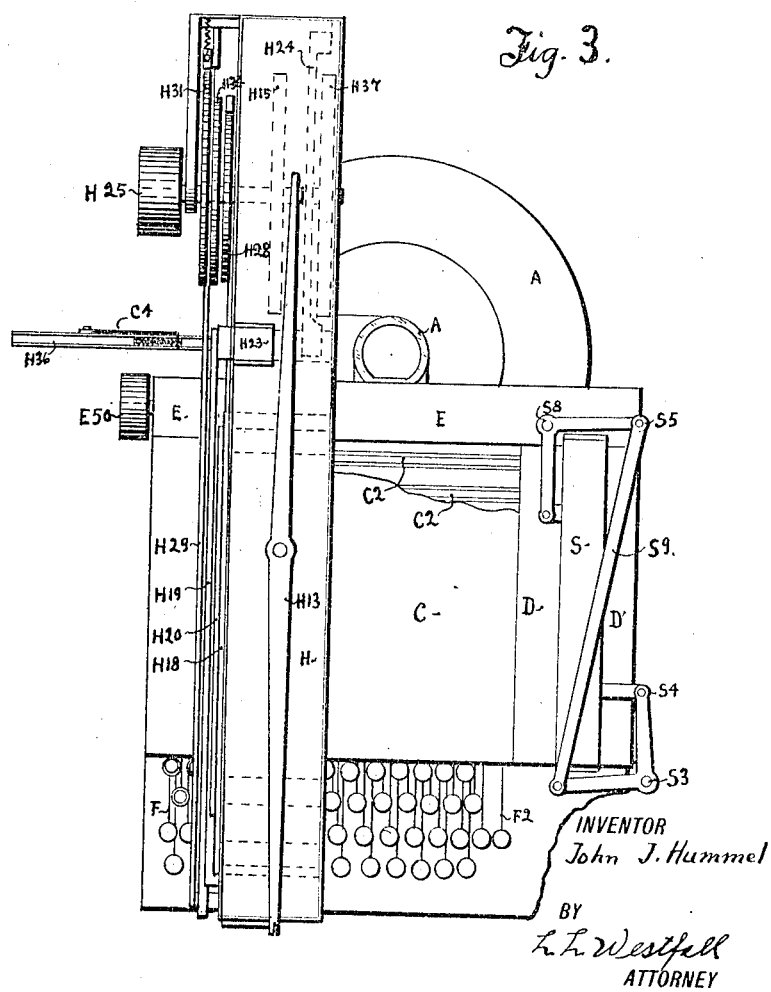
Figure 4:
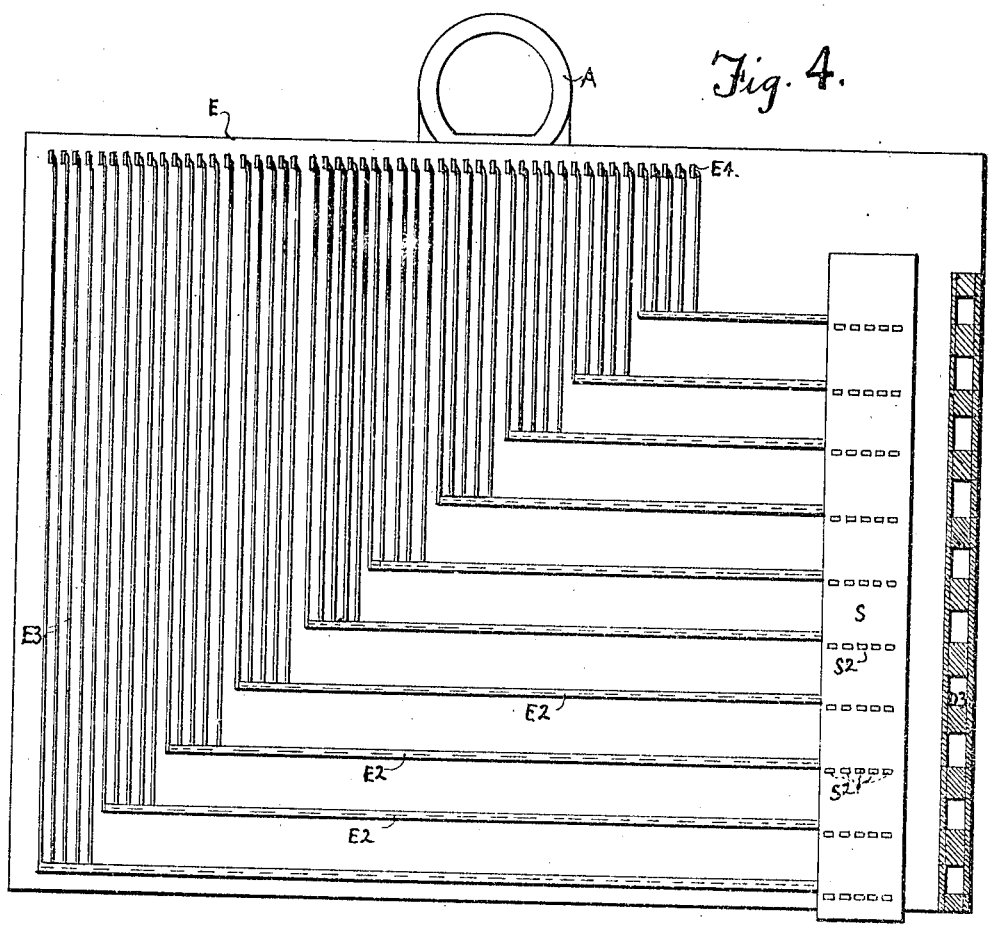
Figure 13:
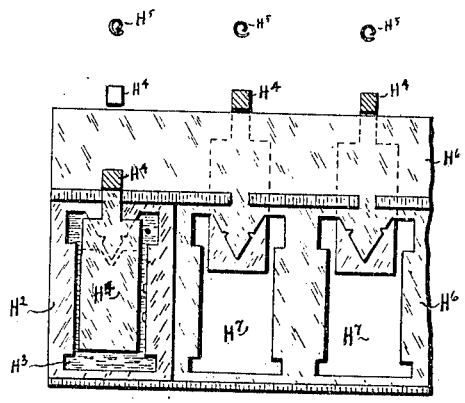
Figure 14:
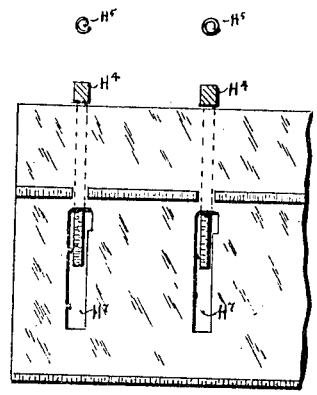
Figure 12:
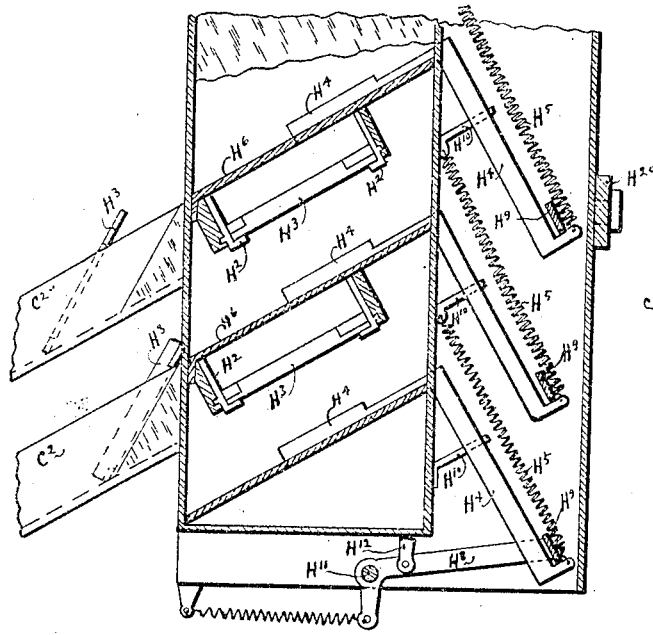

Figure 1 is a front elevation of a machine constructed according to the present invention; Fig. 2 is a side view; Fig. 3 is a plan view; Fig. 4 is a plan view of the keyboard connections on the line $a$, $a$, of Fig. 1; Fig. 5 is a fragmentary view, being a side elevation of a magazine, showing two compartments broken off, and type chutes running a common delivery chute, and a front elevation with respect to Fig. 1, showing in elevation a section or fragment of the keyboard connections and letter shift mechanism; Fig. 6 is a cross sectional view of the keyboard connections taken on the line $b$, $b$, of Figs. 1 and 5; Fig. 7 is a cross section of compartment of the magazine in the form in which it appears when adapted to hold matrices; Fig. 8 is the same when adapted to hold type having a head larger than the body; Fig. 9 is a detailed view of the distributer mechanism; Fig. 10 is a diagrammatic view showing the path of movement of the carriers as they circulate through the distributer; Fig. 11 is a sectional view of a modified construction, using a grooved bar or raceway for matrices to hang on and slide along until they reach a point where they drop off; Fig. 12 is a fragmentary sectional view of the distributer; Fig. 13 is a fragmentary sectional view of the distributer plate and its form for distributing matrices; Fig. 14 is the same adapted for distributing type. Fig. 15 is a vertical detail view of the shift key, and Fig. 16 is a horizontal view of the lower portion of the shift. Fig. 17, is a plan view on an enlarged scale of a type chute, showing the lower end of the type chute as it connects with a common delivery chute, and a cross section of a common delivery chute, escapement shift bars in cross section, and a fragmentary view of a portion of a lever to connect with and operate escapement pawls. Fig. 18 is a cross sectional vertical view of Fig. 17, on the line $a$, $a$. Fig. 19, is an enlarged view of that portion of Fig. 1, where the type is shown as entering the distributer mechanism.

The machine consists of a number of groups of mechanisms, all connected and dependent one on the other.

The first group consists of a magazine C, the second group consists of an extracting and delivering mechanism D, the third group consists of a letter shift mechanism S, the fourth group consists of keyboard connections E, the fifth group consists of a keyboard F, and the sixth group consists of a distributer H. All the groups are supported and firmly held together by means of a frame A.

The magazine C in the present construction consists of one hundred compartments $C^2$, divided into groups of ten, each group being called a section $C^3$, the sections being vertical, the compartments being superimposed one above the other. See Figs. 1, 2, 3, and 5. The compartments are placed on an angle in order that by means of gravity the matrices or type may descend into the type chutes $D^2$, Fig. 5, and thence into the common delivery chute $D^3$, and thence into the assembling chute $D^4$. The magazine compartments C² have a pawl extracting mechanism C⁴, which is operated by means of a lever D⁵. The form of the compartments of the magazine is made according to the form of the matrices or type to be set by the machine. See Figs. 7 and 8.

The extracting and delivering mechanism D consists of one type chute D², equally adapted for delivering type or matrices, for magazine compartments C², making a total of one hundred delivery type chutes D² connecting with one common type chute D³, which has converging channels for delivering the type to a common delivery point, the assembling chute D⁴. Each one of the type chutes D² has one lever D⁵. This lever has a lug 7, by means of which operative contact is secured with the keyboard through the lug 8, which is attached to the shift bar S². The lever D⁵ is pivoted to D² on one end and on the other end has operative contact with the release pawls C⁴ for releasing the type or matrices. The type after being released from C² pass down in an upright somewhat inclined position through the delivery chute D², which is connected with C² on one end and on the other end with the chutes D³, so as to make a continuous unobstructed passage to the assembling chute D⁴. D³ consists of upright channels or chutes, which converge toward the lower end so as to guide the type to a common delivery point. The setting escapement consists of two pawls, one a long one C⁴, which is in the form of a lever and has on one end a fork into which there is slidably connected a pin, which is firmly attached to a second pawl and by which C⁴ is operated, and on the other end C⁴ is pivoted to the side of the type chute C², and has a spring attached to it, which brings it back into position for a second operation. The second pawl is small and resembles somewhat a bell crank with the upper end bent inward and extending across the channel or chute for the purpose of temporarily holding back the column of type in the type chute C², and having on the other end a pin, which engages the fork of the lever pawl C⁴. There is also a projection on the lever pawl C⁴, which extends across the type chute C², so as to hold back the column of type. This projection is below that of the projection on the small pawl, and holds the forward type of the column, which when the small pawl is turned so as to hold back the column of type right behind the first forward type the pawl C⁴ raises up and releases the said type, one type at a time. There is an upper and a lower level to the type chute C², the lower level beginning just back of the projections, so that the forward type will drop to this lower level, in order to make room for the projection on the small pawl to pass over the head of the first type and hold back the type back of the first one when the first one is about to be released by the pawl C⁴.

The letter shift mechanism S consists of fifty shift bars S², which are in groups of five each. See Fig. 5. Each one of these shift bars has two lugs 8, 8, one of which is in operative contact with one of the levers D⁵, the other being out of contact. The letter shift S shifts the extracting mechanism from operative contact with the lower case to the upper case type. There is only a slidable connection between the lugs 7 and 8, and in shifting from the lower to the upper case type there is no interference, the lugs 8 sliding beneath the lugs 7 when the shift is made, the lugs being bent toward each other in such manner that the shift bars S² will readily pass the lugs 7 when the shift is being made. By shifting the shift bars S² toward the magazine the other lug comes in contact with the lug 7 of the other lever D⁵, and the lugs 7 and 8 shown in contact in Fig. 5 will be out of contact, and those shown out of contact will be in contact. See Figs. 17, and 18. Fig. 17 shows one of the levers D⁵, on which there is a lug 7, also shown in Fig. 18. The escapement shift bar S² is shown in Fig. 17 in cross section, and in Fig. 18 a vertical view is shown thereof. S² shows a lug on the side in Figs. 17 and 18, and in Fig. 18 it is shown that this lug 8 is below the lug 7, so that when the escapement shift bar S² is pushed up it will carry with it the lever D⁵, operating the type releasing pawls. In Fig. 17 the escapement shift bar S² is shown as not being in operative contact with the lug 7 of the lever D⁵; but when shifted over so as to come beneath it, it comes in the path of lug 7 when pushed up, as shown in Fig. 18, and operates D⁵. By this means one half of the magazine is always in contact with the keyboard, that is either the one half or the other half. The object is to have a keyboard like a typewriter with a shift key. To operate the escapement shift bars S² are pushed up by means of shafts E² having on one end a pinion, which engages a rack, which is on the end of each shift bar S². See Figs. 5 and 6. Figs. 1, 2, and 3 show the mechanism by means of which S is shifted. S consists of a frame holding the shift bars S² in position, and which are slidably connected thereto. The whole frame S containing the shift bars S² is shifted bodily over toward the magazine C, and is supported and shifted by means of bell cranks S⁴ and S⁵, Fig. 3, and S⁶ and S⁷, Fig. 2, which are connected to shafts S³ and S⁸. Said shafts having bearings connected with D. The bell cranks S⁴ and S⁵ are connected by a connecting rod S⁹, and the bell cranks S⁶ and S⁷ are similarly connected by a connecting rod S¹⁰. The connecting rod S¹⁰ is connected with the shift lever $F^2$ of the keyboard F. See Figs. 1, 2, 15, and 16. By pressing the button of the shift lever $F^2$ the connecting rod $S^{10}$ is drawn forward and turns the bell cranks $S^6$ and $S^7$, which being connected by the shafts $S^3$ and $S^8$ with the bell cranks $S^4$ and $S^5$ cause the body of the letter shift mechanism S to shift toward the magazine C, and thus one half of the magazine is out of operative contact with the keyboard and the other half is in operative contact, and by releasing the shift lever $F^2$ a spring $F^3$ pulls the same back in the original position causing the letter shift mechanism S to return to its former position, and thus alternately the one half or the other half of the magazine is brought in operative contact with the keyboard F.

The keyboard connections E connect the keyboard F up with the shift bars $S^2$, by means of the shafts $E^2$ and connecting rods or wires $E^3$, which are in operative contact or connection with levers $E^4$, to which is connected a pawl $E^6$, which is lifted in the path of a rotating catch $E^5$ by means of a lever $E^7$, which is connected by means of a connecting rod $E^8$ to the keyboard levers $F^4$ of the keyboard F. See Figs. 1, 2, 3, and 4. The rotating catch consists of disks, one for each key, fastened to a shaft, and is driven by power in one direction continuously. The disks are flat and round except for one tooth, which projects so as to engage the pawl $E^6$ when the same is raised up and thrown in its path. The disks are so placed on the shaft that the teeth will form a spiral for the length of the shaft. This is done as a safety device, so that in the event an operator touches two keys at the same time two letters may not come down at once, and lock in the machine, but that one after another may come down in succession, regardless as to whether an operator touches two keys at once or only one at a time. A further object of the power driven shaft with the disks is to make the operation of the keyboard somewhat lighter to the touch.

The keyboard F consists of a series of bell crank levers.

The distributer H consists of a series of carriers $H^2$. These carriers are indicated in dotted lines in Fig. 9, and a cross section in shown in Fig. 12. In Fig. 12 the carriers are shown as holding a matrix $H^3$. If the carriers are to carry type for distribution the carriers will hold the type in the same manner, only the carriers are made to conform to the size of the type. The distribution takes place by means of a push bar made in the form of a square, and is operated by a spring $H^5$, which draws the push bar against the matrix or type, and pushes the matrix or type against the selector plate $H^6$, this selector or distributer plate has ward openings $H^7$. In case of matrices the form of the opening conforms to the form of the matrix to be distributed, so that if it fits it passes through the opening, but if it does not fit it does not pass through, and as there are wards on the upper portion of the matrix, nicks are cut into the V shaped portion of the selector plate corresponding to the wards on the matrix. In the distribution of type the nicks are cut into the type and the wards are on the side of the ward opening of the selector plate. See Figs. 13 and 14. After the push bar $H^4$ has pushed the matrix or type against the selector plate $H^6$ those matrices or type that fit the ward opening are pushed through and by gravity slide down and into the magazine compartments $C^2$, but those that do not pass through drop back into the carrier, the push bar $H^4$ being withdrawn by means of a lever $H^8$. See Fig. 1 and Fig. 12. As disclosed in Fig. 1, one of these levers serves for one selector plate. There are ten selector plates, two of which are disclosed in Fig. 12. In each one of the selector plates there are ten ward openings, by which ten different matrices or type may be distributed, making a total of one hundred ward openings in all the selector plates, one opening for each magazine compartment. For each one of the ward openings there is one push bar $H^4$ permanently connected therewith and slidably connected to the frame of the distributer, having bearings $H^{10}$. The push bar $H^4$ is operated by means of a spring $H^5$ and a bar $H^9$, which is held by the lever $H^8$. There are two sets of these levers, and are connected by the bar $H^9$, and by the shaft $H^{11}$, and by connecting rods $H^{12}$. See Figs. 1 and 12. The levers $H^8$ are operated by a lever $H^{13}$, which connects with an upright lever $H^{14}$, which is operated by a cam $H^{15}$. See Figs. 3 and 9. As indicated by the diagram Fig. 10 the carriers move first in one direction step by step along the selector plate, thence they are raised up to the level of the next selector plate without being turned around, and travel back the full length of the selector plate, and beyond it, thence up to the next selector plate, and thus travel back and forth and up, until they reach the last selector plate, and then they return to the starting point, and thus travel in an endless path. The movement of the carriers is accomplished by means of pushers $H^{16}$, $H^{17}$, and $H^{18}$, and the levers $H^{19}$ and $H^{20}$. $H^{21}$ and $H^{22}$ are two sliding members, which are operated by the lever $H^{20}$, and have compartments for receiving the carriers, and serve to raise the carriers to the next selector plate. The lever $H^{19}$ operates a carrier holder, capable or receiving one carrier, which when it enters into it is carried down by said lever to the starting point. At the starting point the pusher $H^{18}$ pushes the carrier out of carrier holder $H^{23}$, whence the lever $H^{19}$ raises the empty carrier holder $H^{23}$ back to the position as shown in Fig. 9, in order to receive another carrier, which is again brought down to the starting point, and so on indefinitely. $H^{18}$ also operates the pushers $H^{16}$ and $H^{17}$, being slidably connected therewith, as disclosed in Fig. 9. The pushers $H^{16}$ and $H^{17}$ push the carriers $H^2$ out of the sliding member $H^{21}$, and into the sliding member $H^{22}$, and out of the sliding member $H^{22}$, and into the sliding member $H^{21}$, back and forth continuously, except that intermediately between the movements the lever $H^{20}$ operates the sliding members $H^{21}$ and $H^{22}$, raising one up with its load of carriers, and lowering the other that is empty, and again raising it after it has received a load of carriers, and lowering the empty one. In Fig. 9 the sliding member $H^{21}$ is loaded with carriers, and $H^{22}$ is empty. The next movement now would be for $H^{22}$ to descend and for $H^{21}$ to ascend, then the next movement would be for $H^{16}$ to push the carriers out of $H^{21}$ and into $H^{22}$ and one in $H^{23}$, and the next movement would be for $H^{23}$ to descend to the starting point, and the next movement would be for the pusher $H^{18}$ and the pusher $H^{17}$ to push the carriers out of $H^{23}$ and $H^{22}$ respectively, and into $H^{21}$, and thus causing a continuous circulation of carriers by a step by step movement in an endless circuit.

The type for distribution being held in carriers, which by a shuffling step by step movement carry the type over selector plates $H^2$, having ward openings $H^7$ corresponding to the type to be distributed, are in contact with said selector plates and ward openings only when the carriers are stationary, and while directly opposite said ward openings are pushed against the same and pass through if the wards correspond to the nicks in the type, and by gravity slide into the type chutes $C^2$; but such as do not correspond to the opening drop back into the carriers and far enough away from the opening so as not to get caught in the same, and in the event any should fail to drop back by gravity into said carriers the pushers $H^4$ will push them back when they return to the position as shown in Fig. 12. As soon as the type has returned to the position as shown in Fig. 12 the carriers are moved one step forward to a position again directly opposite the ward openings, and all the type are again pressed against the selector plate, and such as fit the openings pass through and into their respective type chutes $C^2$, and the others return to the carriers as before, and thus the process is continued until all the type have found the ward openings having wards corresponding to the nicks of the type. There is one ward opening for each type chute, making in the present construction one hundred such openings, and for each opening there is one carrier and one pusher, and as many additional carriers as are needed to fill the circuit.

The carriers are loaded with matrices or type at the starting point, each carrier holding one matrix or type. The loading is done by a lever 24, which pushes the matrix or type into the carrier. The distributer is fed continuously with matrices or type from a type galley or chute, $H^{36}$. See Figs. 1 and 3, and Fig. 19. In Fig. 19 a detailed vertical sectional view is given on an enlarged scale as to the manner that type $H^3$ enters the carriers $H^2$. The type $H^3$ is held in reserve in a chute or galley $H^{36}$, from which it is fed one at a time as $H^{23}$ descends carrying with it an empty carrier $H^2$. The type $H^{3a}$ is shown as about to enter by gravity the jaws of the lever $H^{24b}$, $H^{24a}$, which is permanently held in the carrier holder $H^{23}$, being held in position by a sliding bar $H^{24d}$, and a spring $H^{24c}$, and bearings $H^{40}$, and being operated by the lever $H^{24}$ shown in Figs. 1 and 9, and forming a disconnectible portion thereof, so that when the type $H^3$ enters said jaws the lever $H^{24}$ will lower said jaws, to the bottom of carrier $H^2$, so that when the carrier $H^2$ is pushed out of the carrier holder $H^{23}$ by the pusher $H^{18}$ it will carry with it the type, and distribute it in its proper channel. The releasing mechanism for releasing the type from the chute $H^{36}$ is similar to the escapement pawls and levers of the type magazine C, and is to be operated by contact with $H^{23}$; but as the details thereof are not disclosed in the drawings no claim is made for the detail construction not given.

The mechanism of the distributer is controlled and operated by means of a series of cams on a shaft $H^{25}$. This shaft is driven by power by a pulley and belt as disclosed in Fig. 2.

The pusher $H^{18}$ is connected with a lever $H^{26}$, which is pivoted to the frame of the distributer H, and is operated by means of a spring $H^{27}$ and a cam $H^{28}$. The lever $H^{19}$ is connected by means of a connecting rod $H^{29}$ to a lever $H^{30}$, which is pivoted to the frame of the distributer H, and is operated by a cam $H^{31}$ and a spring $H^{32}$. The lever $H^{20}$ is connected by a lever $H^{33}$, which is pivoted to the frame of the distributer H, and is operated by a cam $H^{34}$ and a spring $H^{35}$. The shaft $H^{25}$ is firmly attached to the cams, and has bearings in side hangers of the frame of the distributer H.

Fig. 11 is a modification workable only when Fig. 9 is made a horizontal view and the mechanism in Fig. 12 is eliminated. Fig. 11 discloses a carrier $H^2$, a matrix $H^3$, and a V shaped bar with ribs or grooves $H^{36}$, on which the matrix is suspended and along which it travels until it reaches a point where the ribs by which it is suspended have been cut away, when it drops by gravity into a type chute directly below it. The construction is practical for matrices only, and not for type, and is practical only where the distributer is placed on top of the machine, rather than on the side. Fig. 11 is given only to show the possibility of adapting the construction as disclosed in Fig. 9 to other means of distribution from that shown in Figs. 12 and 13.

Having thus described my invention, what I claim is:—

1. A type setting machine comprising a magazine; a holding and extracting mechanism, a delivery mechanism; a letter shift mechanism having shift bars slidably connected and supported by a frame, said frame being connected with bell cranks jointed together by connecting rods and shafts, and having means for turning said shafts to shift the said frame holding the said shift bars; intermediate mechanism; a manually operative keyboard; and a distributer.

2. A type setting machine comprising a magazine; a holding and extracting mechanism; a delivery mechanism; a letter shift mechanism; intermediate mechanism having rocking shafts adapted to operate shift bars to operate an extracting mechanism, connections to connect said rocking shafts to levers, pawls attached to said levers, and a shaft, power operated, having teeth laterally disposed in spiral formation for successively engaging said pawls when the same are brought in operative contact with said teeth; a manually operative keyboard; and a distributer.

3. A type setting machine comprising a magazine; a holding and extracting mechanism; a delivery mechanism; a letter shift mechanism; intermediate mechanism; a manually operative keyboard having bell crank levers in combination with a connecting rod connected to a lever adapted to operate pawls of said intermediate mechanism; and a distributing mechanism.

4. A type setting machine comprising a magazine; a holding and extracting mechanism; a delivery mechanism; a letter shift mechanism; intermediate mechanism; a keyboard, manually operated, having bell crank levers in combination with a connecting rod connected with a lever adapted to operate a pawl attached to a lever of said intermediate mechanism, and a bell crank lever operatively connected with said shift mechanism; and a distributer.

5. A type setting machine comprising a magazine; a holding and extracting mechanism; a delivery mechanism; a letter shift mechanism; intermediate mechanism; a manually operative keyboard; and a distributer having carriers adapted to carry matrices or type, push bars to push the carriers by a step by step movement one way and the other, sliding members having chambers for holding carriers, and an evener lever for shifting said sliding members back and forth by a step by step movement.

6. A type setting machine comprising a magazine; a holding and extracting mechanism; a delivery mechanism; a letter shift mechanism; intermediate mechanism; a manually operative keyboard; and a distributer having carriers adapted to carry matrices or type, sliding members having chambers for holding carriers, push bars adapted to enter the chambers of said sliding members and push the carriers out of one sliding member and into the other, a lever attached to said push bars, a cam, power operated, to operate said lever, an evener lever to operate said sliding members, another lever connected with said evener lever, and a cam, power operated, in operative contact with said lever to operate said sliding members.

7. A type setting machine comprising a magazine; a holding and extracting mechanism; a delivery mechanism; a letter shift mechanism; intermediate mechanism; a manually operative keyboard; and a distributer having carriers adapted to carry matrices or type, means for moving said carriers by a step by step movement in a zigzag course, and means for returning said carriers to the starting point.

8. A type setting machine comprising a magazine; a holding and extracting mechanism; a delivery mechanism; a letter shift mechanism; intermediate mechanism; a manually operative keyboard; and a distributer having carriers adapted to carry matrices or type, means for moving said carriers by a step by step movement, a movable member adapted to hold the last carrier at the end of the course, a lever connected with said member, and means for operating said lever to return the carrier to its starting point.

9. A type setting machine comprising a magazine; a holding and extracting mechanism; a delivery mechanism; a letter shift mechanism; intermediate mechanism; a manually operative keyboard; and a distributer having carriers adapted to carry matrices or type, means for moving said carriers along a given course by a step by step movement, a movable member having a compartment adapted to receive the last carrier and return it to the starting point, a lever connected to said member, a connecting rod connecting said lever to another lever, a cam, power operated, in operative contact with said lever to operate said movable member to return the carriers one at a time to the starting point, and means for returning the said movable member in place to receive carriers one at a time, and by means of said cam bring the carrier received back to the starting point to again resume its journey and continue to follow the same course as before.

In testimony whereof I have affixed my signature in presence of two witnesses.

JOHN J. HUMMEL.

Witnesses:
L. L. WESTFALL,
GEO. E. CANFIELD.

Copies of this patent may be obtained for five cents each, by addressing the "Commissioner of Patents, Washington, D. C."